UNITED STATES PATENT OFFICE.

WILLIAM J. HOUGH, OF TOLEDO, OHIO.

PROCESS OF TREATING "SPENT" PULPING LIQUORS.

945,394.     Specification of Letters Patent.     Patented Jan. 4, 1910.

No Drawing.     Application filed May 3, 1909. Serial No. 493,679.

*To all whom it may concern:*

Be it known that I, WILLIAM J. HOUGH, residing at Toledo, in the county of Lucas and State of Ohio, have invented certain new and useful Improvements in the Process of Treating "Spent" Pulping Liquors, of which the following is a specification.

This invention relates to a method of treating a "spent pulping" solution containing ligneous matter, whereby valuable products are obtained from the ligneous matter and the reagent in the pulping solution recovered in a new, facile and economic manner.

The process involves the liberation of the cellulose of resinous vegetable fibrous material by the action of chemical solutions upon the material; the reproduction from the chemical solution of the original resinous matter, or a product of its further manipulation; the production of oil and of gas from the ligneous matter; and recovering the alkali in case the chemical solution is an alkali compound.

Inasmuch as the art to which this invention refers consists of a number of related and sequential operations, the present invention may be best understood from an explanation of these individual steps. Accordingly I will proceed in this specification to set forth the separate consecutive steps as actually practiced, beginning with the provision of the raw material to be treated and ending with the recovery of most of the reagent that has been employed, and explaining particularly the one of said processes which constitutes my present invention.

Vegetable fibrous material may be said to consist substantially of moisture and insoluble cellulose, soluble ligneous substances, and in many cases resin or oleo-resin. In this specification all the organic constituents of the fibrous material aside from the cellulose and resin, or oleo-resin, will be termed ligneous matter, for the sake of brevity.

*Treatment of the vegetable fibrous material containing resin to separate it into resinous matter, ligneous matter and cellulose.*—The fibrous material is treated according to the ordinary processes for the manufacture of wood pulp, as by a hot alkali solution. In the process of digestion the resinous matter and the ligneous matter are so affected by the chemical used that they are liquefied, while the cellulose remains practically unaltered as a solid. As the next step in the process I separate the cellulose, or pulp, the resinous matter, and the alkali solution containing the ligneous matter, and treat the two latter separately as hereinafter described.

*Separation of the resinous matter, ligneous matter, and cellulose.*—In the process of digestion the resinous matter and ligneous matter are liquefied, while the cellulose remains as a solid. I now separate the cellulose from the other two major constituents of the wood, by drawing off the liquid or by a filtering operation. In this solution the ligneous matter remains permanently dissolved, while the resinous matter, now in the form of an alkali compound, or resinate, separates from the solution in the solid state on standing and may then be removed.

Instead of separating from the insoluble cellulose both the liquefied resinous matter and ligneous matter contained in the solution, I may allow the resinous matter to separate and solidify while in contact with the cellulose, and then draw off the solution now containing practically none of the resin, recovering the resinous matter from the pulp as by a subsequent washing. Upon standing, the dissolved resinous matter is precipitated, a portion settling to the bottom, while another portion remains on top, and some is held in suspension. I may separate the solid resinates on top by any of the usual methods, then separate the remaining solid resinous matter with the cellulose, draw off the solution containing the ligneous matter, and then recover the resinous matter in contact with the cellulose from the cellulose by washing. For further explanation of the method of bringing about the separation of the resinous matter, reference is made to my co-pending application, Serial No. 493,680, filed May 3, 1909, for process of recovering resinous matter.

We will now consider the utilization of the resinous matter separated as above.

*Utilization of the resinous matter.*—The resinous matter recovered as above described from a solution resulting from an alkali treatment of fibrous material containing resin, is obtained in the form of alkali compounds of resin, called resinates, which I may use directly as soap; or which I preferably purify from coloring matter; or I may obtain by treatment of the alkaline resinous matter with acids, free resin, which is a very valuable product. The alkaline resinous matter I may also utilize for the manufacture of valuable oils by distilling it destructively; in so doing I recover the alkali combined in it.

*Utilization of the vegetable matter other than cellulose or resinous matter.*—The liquid containing the extracted ligneous matter, and from which the resinous matter has been separated, is now concentrated as in the ordinary processes, by evaporating from it the major part of the water contained. I now subject the resulting concentrated liquid to a destructive distillation, by which means I recover from it gas and oils, which are produced by the action of heat alone, and at the same time the alkali which was contained in the liquid remains in the still, and this alkali is purified and prepared for further use by the ordinary process of lixiviation, etc. If it is desired, the highly concentrated liquid before being destructively distilled, may be deprived of all the water which it contains by a further heating, as in open pans for instance.

The oil which I obtain from the ligneous matter is a valuable commercial product, which, among its other uses, is particularly of service as a wood preservative. The gas produced may be utilized to furnish heat for the reaction or for any other desired purpose. The impure alkali remaining in the still may be rendered liquid by heat, and then withdrawn for purification.

I hereby define "spent" liquors as the solution resulting from a chemical treatment of resinous fibrous material to produce pulp therefrom.

It is to be understood that many variations are possible, as regards the different steps employed, the order of their succession, their inclusion or omission, the materials treated, and the reagents used, without departing from the contemplated scope of my invention, and I intend no limitations whatsoever, except such as are set forth in the appended claims.

Having described my invention what I claim as new and desire to secure by Letters Patent is:

1. The process of treating "spent" pulping liquors containing resinous salts which consists in separating the resinous salts therefrom, and then subjecting the residue to destructive distillation to produce an oil suitable for creosoting or other purposes.

2. The process of treating "spent" alkaline pulping liquors containing resinous salts which consists in separating the resinous salts therefrom; subjecting the residue to destructive distillation to produce an oil suitable for creosoting or other purposes; and recovering the alkali.

3. The process of treating "spent" pulping liquors containing resinous salts, which consists in separating the resinous salts therefrom; concentrating the residual liquors; and destructively distilling them to produce an oil suitable for creosoting or other purposes.

4. The process of treating "spent" alkaline pulping liquors containing resinous salts which consists in separating the resinous salts therefrom; concentrating the residual liquors; destructively distilling them to produce an oil suitable for creosoting or other purposes; and recovering the alkali.

In testimony whereof I affix my signature in the presence of two witnesses.

WILLIAM J. HOUGH.

Witnesses:
 FRANK J. KENT,
 MARTHA BUSCHER.